(12) United States Patent
Masson et al.

(10) Patent No.: US 8,587,294 B2
(45) Date of Patent: Nov. 19, 2013

(54) ANGULAR OR LINEAR MAGNETIC POSITION SENSOR NOT SENSITIVE TO EXTERNAL FIELDS

(75) Inventors: Gérald Masson, Ann Arbor, MI (US); Nikola Jerance, Oxford (GB); Didier Frachon, Besançon (FR); Richard Arlot, Bonnevent Velloreille (FR); Thierry Dorge, Arc et Senans (FR)

(73) Assignee: Moving Magnet Technologies (MMT), Besancon (FR)

( * ) Notice: Subject to any disclaimer, the term of this patent is extended or adjusted under 35 U.S.C. 154(b) by 508 days.

(21) Appl. No.: 12/744,043

(22) PCT Filed: Nov. 20, 2008
(Under 37 CFR 1.47)

(86) PCT No.: PCT/FR2008/001626
§ 371 (c)(1),
(2), (4) Date: Nov. 23, 2010

(87) PCT Pub. No.: WO2009/101270
PCT Pub. Date: Aug. 20, 2009

(65) Prior Publication Data
US 2012/0161755 A1    Jun. 28, 2012

(30) Foreign Application Priority Data
Nov. 20, 2007    (FR) .................................... 07 08132

(51) Int. Cl.
*G01B 7/30* (2006.01)
*G01B 7/14* (2006.01)

(52) U.S. Cl.
USPC ................ 324/207.24; 324/207.25

(58) Field of Classification Search
USPC ........................ 324/207.24, 207.25
See application file for complete search history.

(56) References Cited

U.S. PATENT DOCUMENTS

2005/0253578 A1    11/2005    Kawashima et al.

FOREIGN PATENT DOCUMENTS

| DE | 10 2006 051 720 A1 | 9/2007 |
|---|---|---|
| EP | 1 074 818 A2 | 2/2001 |
| EP | 1 083 406 A2 | 11/2005 |
| FR | 2 893 410 A1 | 5/2007 |
| FR | 2 898 189 A1 | 9/2007 |
| WO | WO-2007/099238 A1 | 9/2007 |

*Primary Examiner* — Reena Aurora
(74) *Attorney, Agent, or Firm* — Arent Fox LLP (57) ABSTRACT

The invention relates to an angular or linear magnetic position sensor that comprises a mobile member including at least one magnet (1) having a magnetization direction that varies linearly along the movement direction of the magnet in a surface defined by said movement direction and in a normal direction, at least four magneto-sensitive elements (2, 3 and 4, 5) and at least one processing circuit (6) providing a signal based on the absolute position of the mobile member, characterized in that a first set of magneto-sensitive elements (2, 3) and (4, 5) are located at a same point, the first couple of magneto-sensitive elements (2, 3) being spatially offset from a second couple of magneto-sensitive elements (4, 5) along the movement direction, and in that the magneto-sensitive elements (3 and 5) measure the tangential component of the magnetic field while the magneto-sensitive elements (2 and 4) measure the normal component of the magnetic field in order to provide, after algebraic combination of the components taken in pairs, two sinusoidal signals substantially having an electrical phase shift of 90°.

11 Claims, 13 Drawing Sheets

Prior Art

Figure 1

Prior Art

Angle=Atan (Bn1/Bn2)

Figure 2

Prior Art

Figure 3

Prior Art

Angle=Atan (((Bn1a+Bn1b)+(Bt2a+Bt2b))/((Bt1a+Bt1b−(Bn2a+Bn2b)))

ANGULAR OR LINEAR MAGNETIC POSITION SENSOR NOT SENSITIVE TO EXTERNAL FIELDS

CROSS-REFERENCE TO RELATED APPLICATION

This application is a National State entry of International Application No. PCT/FR2008/001626, Nov. 20, 2008, which claims priority to French patent application Ser. No. 07/08132 filed Nov. 20, 2007, the disclosure of the prior applications are incorporated in their entirety by reference.

The present invention relates to the field of rotating and linear magnetic position sensors for angles which can reach 360° or more and displacements which can reach hundreds of millimetres, and more particularly the position sensors intended for measuring the angular position of the steering column for a motor vehicle, without this application being exclusive.

Contactless sensors which can detect the angle or a displacement from a magnetic field have numerous advantages:
- no mechanical contact with the mobile part and thus no wear,
- immunity to dirt,
- reduced production costs,
- extended service life.

In the state of the art, patent EP1083406 is known, which discloses a rotating sensor (FIGS. 1 and 2), showing a ring-shaped magnet and two magneto-sensitive elements measuring the radial component of the field generated by the magnet and leading to two quadrature sinusoidal signals used, after decoding, for detecting the position on 360 degrees.

The drawback of such solution is its sensitivity to the external field. As a matter of fact, any external field in the plane of probes will entail a significant non-linearity error.

In the state of the art, the applicant's patent WO07057563 is known, which describes a position sensor (FIGS. 3 and 4) making it possible to use two (radial and tangential or axial and tangential) components of the magnetic field substantially measured in only one point out of the axis of rotation of a diametrally magnetised ring-shaped magnet or disc-shaped magnet, so as to know the angular position thereof, even though such angle does not match the angle of the magnetic field. The radial component and the axial component of the magnetic field generated by the magnet are both in-phase sinusoids, whereas the tangential component is a sinusoid having an electrical phase shift of 90° with respect to both the other components of the magnetic field (refer to FIG. 4). It is thus possible to use a couple of magnetic field (tangential and radial or tangential and axial) components having an electrical phase shift of 90° for decoding the angle of the magnet. The decoding of the angular position of the magnet from such two components, the amplitudes of which are generally different, requires a normalisation of both components used to be able to calculate the tangent arc, so as to deduce the angle therefrom. It is also known, in the state of the art, and from the applicant's patent PCT WO27099238 which describes a linear and rotating position sensor (for angles smaller than 360°) using the same principle as the 360° sensor described above. It uses two (normal and tangential or axial and tangential) components of the magnetic field substantially measured at the same point and generated by a flat magnet or a tile, the magnetisation direction of which continuously varies along the displacement.

The drawback of these two solutions is the sensitivity to every external magnetic field. It is possible to armour the sensor, but this adds extra parts and increases the manufacturing costs as well as the overall dimensions of the sensor. In addition, the application of a gain between the components is a problem (sensor noise, temperature drift) and the diametral magnetisation (in the case of the 360° sensor) is not easy and may cause harmonic errors. As a matter of fact, the performances (linearity of the output signal) of the 360° sensor directly depend on the obtaining of a correct diametral magnetisation. The magnetisation field, shown in FIG. 5, required for diametrally magnetising a ring-shaped magnet is easily obtained with a simple coil run through by a current. The difference in the magnetic permeability between the air and the material to be magnetised produces a curvature of the field lines, a curvature which follows the following refraction relation at the boundary between two media:

$$\frac{\tan(\alpha_1)}{\tan(\alpha_2)} = \frac{\mu_{r1}}{\mu_{r2}}$$

Figure 4:
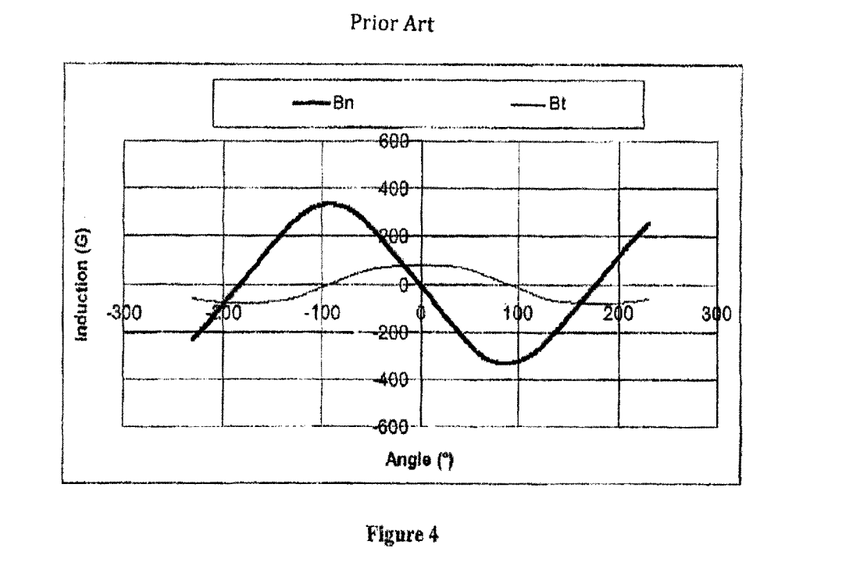
FIG. 4 shows the normal and tangential component of the magnetic induction at the same point in a solution of the prior art.

This curvature results in a magnetisation of the material which is not diametral, and thus, in a distortion of the two measured components, as they are shown in FIG. 4. Both signals are not two perfect sinusoids having an electrical phase shift of 90°, which results, upon the decoding, in a very significant non-linearity, as can be seen on the same FIG. 6, which shows the signal decoded using both components of the magnetic field.

The present invention aims at solving the mentioned hereabove problems by using a combination of two pairs which are (normal and tangential) components of the magnetic field measured in two points spatially shifted preferably by a quarter of a period.

For a rotating sensor, the period is the total angle of the magnet.

For the linear sensor, the period is the length thereof.

Two components are measured at the same point (physically, we shall consider that the measures are taken at the same point, if the effective distance between the measuring points of the two components of the magnetic field is less than 5 mm) and two other components are measured at another point spatially shifted by approximately a quarter of a period (For example: phase shift of 90° for a 360° sensor). The solution described herein-under thus makes it possible to reduce the effect of the external field, to compensate a part of the harmonic errors due to the magnetisation and no longer to use gain between the components.

Let:
Bn1 be the Component normal to point 1
Bt1 be the Component tangential at point 1
Bn2 Component normal to point 2
Bt2 Component tangential at point 2
Let TÉTA be the angle of rotation, and while taking into account the harmonic 3 error (majority error) due to the diametral magnetisation, we have:

$$Bn1 = h_1 * \cos(TETA) + h_3 * \cos(3TETA)$$

$$Bt1 = h'_1 * \sin(TETA) + h'_3 * \sin(3TETA)$$

If points 1 and 2 are spatially shifted by 90°, then $$Bn2 = h_1 * \cos(TETA + 2/PI) + h_3 * \cos(3(TETA + 2/PI))$$
$$= -h_1 * \sin(TETA) + h_3 * \sin(3TETA)$$

$$BT2 = h'_1 * \sin(TETA + 2/PI) + h'_3 * \sin(3(TETA + 2/PI))$$
$$= h'_1 * \cos(TETA) - h'_3 * \cos(3TETA)$$

The present invention aims at combining the components two by two as follows:

$$Bn = Bn1 + Bt2$$

$$Bt = Bt1 - Bn2$$

Then:

$$Bn = h_1 \cos(TÉTA) + h_3 * \sin(3TÉTA) + h'_1 * \cos(TÉTA) - h'_3 * \cos(3TÉTA)$$

$$= (h_1 + h'_1) * \cos(TÉTA) + \underbrace{(h_3 - h'_3)}_{\sim 0} * \cos(3TÉTA)$$

$$= (h_1 + h'_1) \cos(TÉTA)$$

$$Bt = h_1 * \sin(TÉTA) - h_3 * \sin(3TÉTA) + h'_1 + \sin(TÉTA) + h'_3 * \sin(3TÉTA)$$

$$= (h_1 + h'_1) * \sin(TÉTA) + \underbrace{(h'_3 - h_3)}_{\sim 0} * \sin(3TÉTA)$$

$$= (h_1 + h'_1) * \sin(TÉTA)$$

Then, the two signals obtained have the same amplitude but have a phase shift of 90° and are almost perfectly sinusoidal. As a matter of fact, the combination of an imperfect normal component (with a triangular shape due to a harmonic 3) with an imperfect tangential component (with a rectangular shape due to an harmonic 3) makes it possible to cancel or at least significantly reduce such harmonics defect and to obtain two almost sinusoidal components.

Besides (refer to FIGS. 13 and 14), if we have an external magnetic field along axis x and y (Bx_ext and By_ext), the two by two combination of the components makes it possible to cancel the effect of the external field.

Figure 13:
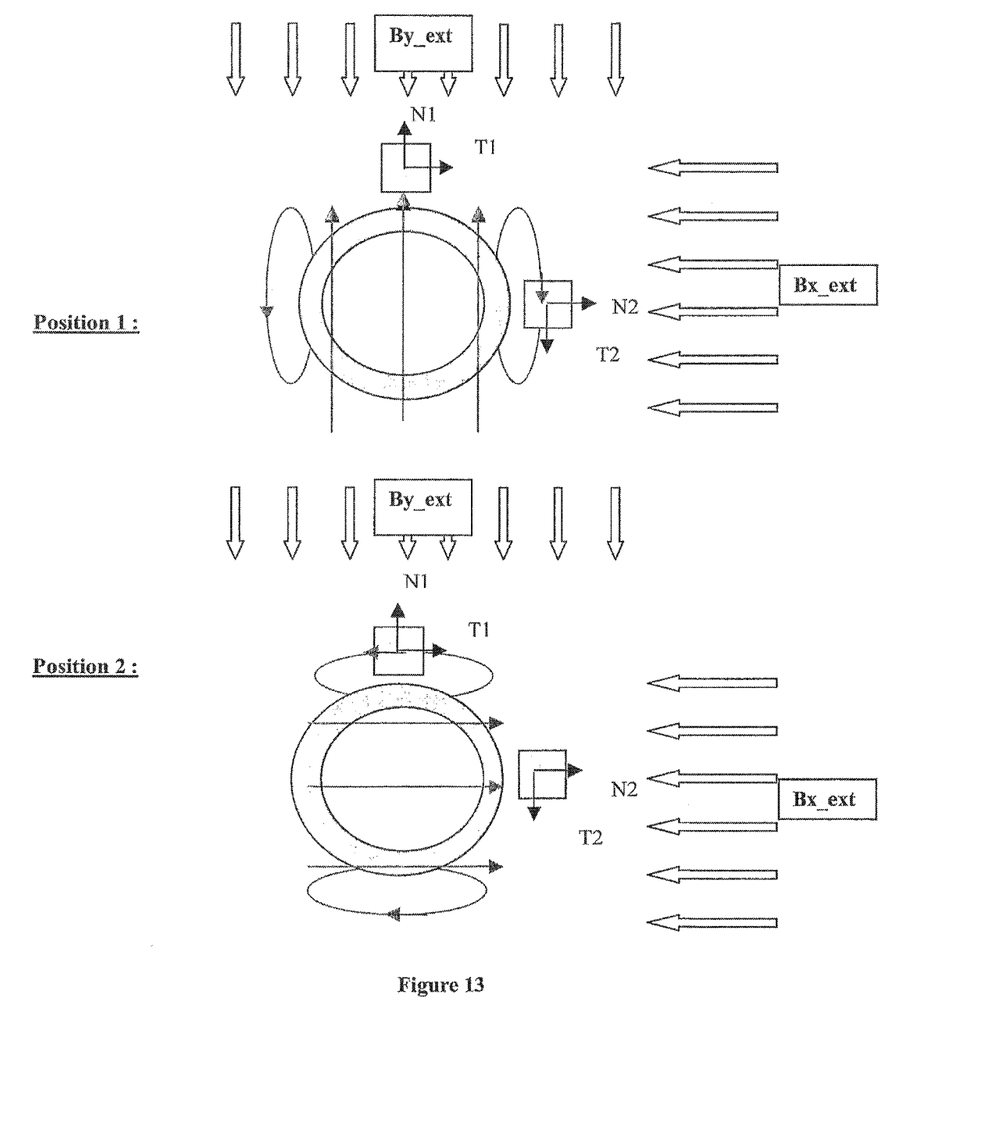
FIG. 13 shows two angular positions of the magnet in presence of an external magnetic field.

Thus, if we refer to the position 1 of the magnet in FIG. 13, we have:

$Bn1=Bn\_max-By$-ext $Bt1=-Bx\_ext$ $Bn2=-Bx\_ext$ $Bn1=Bt\_max+By$-ext which finally gives:

$Bn=Bn1+Bt2=Bn\_max+Bt\_max$ $Bt=Bt1-Bn2=0$

If we now refer to the position 2 of the magnet in FIG. 13, we now have:

$Bn1=0-By$-ext $Bt1=-Bt\_max-Bext$ $Bn2=Bn\_max-Bext$ $Bt2=By$-ext which gives:

$Bn=Bn1+Bt2=0$ $Bt=Bt1-Bn2=-Bn\_max-Bt\_max$

The two signals obtained have the same amplitude and the effect of the external field has been cancelled.

According to an advantageous embodiment, to improve the accuracy of the configuration of a rotating sensor, when harmonic 3 of the normal and tangential components are not equal (h'3−h3)≠0. This embodiment mentions again every point of the above description and thus incorporates all the advantages thereof.

Figure 25:
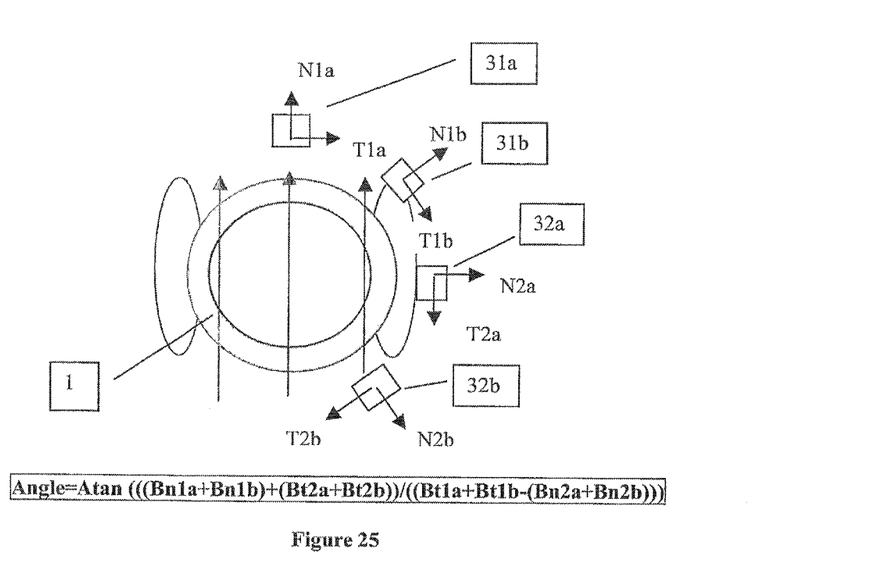
FIG. 25 shows a general view of the present invention with both bidirectional probes 31a and 32a associated with two other bidirectional probes 31b and 32b.

In addition, it adds a new advantage in the compensation of the entirety of harmonic 3 defects due to the magnetisation defects related to the geometry of the magnet, so as to obtain two perfectly sinusoidal components through the utilisation of a clever combination of 4*2 (normal and tangential) components of the magnetic field measured in 2*2 points respectively spatially shifted by ¼ ⅛ of a period (shift of 45° for a 360° sensor) as shown in FIG. 25.

Let:
Bn1*a* be the Component normal to point 1a
Bn1*b* be the Component normal to point 1b
Bt1*a* be the Component tangential at point 1a
Bt1*b* be the Component tangential at point 1b
Bn2*a* be the Component normal to point 2a
Bn2*b* be the Component normal to point 2b
Bt2*a* be the Component tangential at point 2a
Bt2*b* be the Component tangential at point 2b

The present solution provides to combine two by two the normal and tangential components of both couples of points (a and b) having a shift of ⅛ of a period prior to the above-described combinations, the solution which makes it possible to cancel the harmonic residual (h₃−h'₃) as follows:

$Bn1=Bn1a+Bn1b$ $Bt1=Bt1a+Bt1b$ $Bn2=Bn2a+Bn2b$ $Bt2=Bt2a+Bt2b$

Let TÉTA be the angle of rotation, and as in the description of the previous solution, taking into account the harmonic 3 error (majority error) due to a diametral magnetisation, we obtain, with (h₃−h'₃)=0:

All the considerations with an external magnetic field remain unchanged.

The digital signal processing circuit combines the components (which makes it possible to obtain two sinusoids, the amplitude of which is substantially the same) and carries out the various compensations (offset, orthogonality, variation in parameters of the temperature probe) before carrying out the division and the calculation of the tangent arc. The angle obtained is available at the outlet of the integrated circuit, for example as a voltage proportional to such angle.

Figure 20:
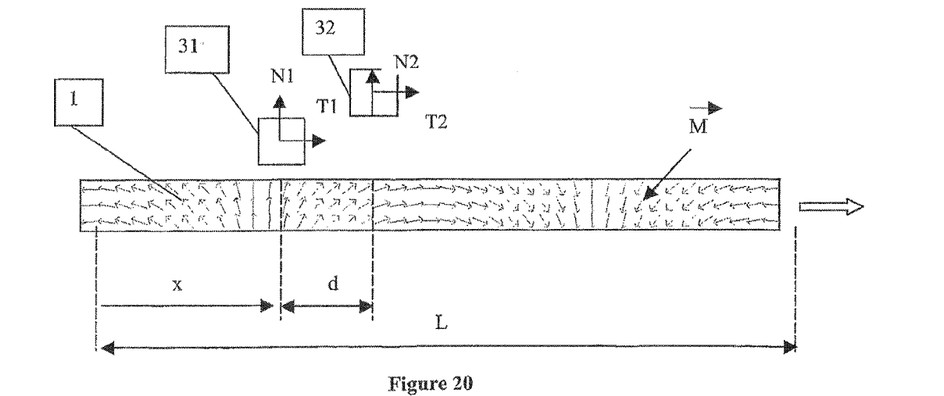
FIG. 20 shows a side view of the present invention with both bidirectional probes 31 and 32.
Figure 21:
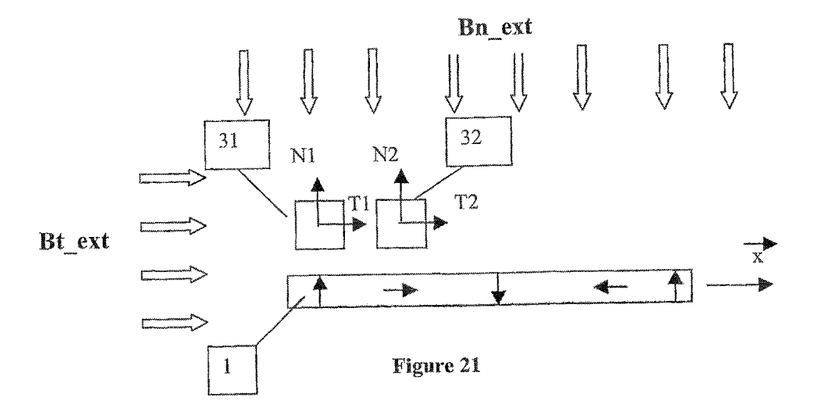
FIG. 21 shows a side view of the present invention with both bidirectional probes 31 and 32 in the presence of external fields.

In a linear configuration such as shown in FIGS. 20 and 21 in which the magnetic field continuously rotates along the travel of the sensor, the components of the magnetic field can also be combined two by two for eliminating the external field.

Let:
Bn1 be the Component normal to point 1
Bt1 be the Component tangential at point 1
Bn2 be the Component normal to point 2
Bt2 be the Component tangential at point 2
x be the travel of the sensor, L the total travel of the sensor
d be the distance between point 1 and point 2 (0<d<L).
Then $$Bn1 = h_1 * \cos(2xL/PI) - By\_ext$$

$$Bt1 = h'_1 * \sin(2xL/PI) + Bx\_ext$$

$$Bn2 = h_2 * \cos(2xL/PI + 2dL/PI) - By\_ext$$

$$Bt2 = h'_1 * \sin(2xL/PI + 2dL/PI) + Bx\_ext$$

$$\text{Let } Bn1 - Bn2 = h_1 * (\cos(2xL/PI) - \cos(2xL/PI + 2dL/PI))$$

-continued $$Bt1 - Bt2 = h'_1 * (\sin(2xL/PI) - \sin(2xL/PI + 2dL/PI))$$

$$Bn1 - Bn2 = h_1 * (\cos 2xL/PI - \cos(2xL/PI + 2dL/PI))$$
$$= -2h_1 * \sin(2xL/PI + dL/PI) * \sin(-d/L*PI)$$
$$= (-2*h_1 * \underline{\sin(-d/L*PI)}) * \sin(2xL/PI + dL/PI)$$
$$\text{Constant } -A.h1$$

$$Bt1 - Bt2 = h'_1 * (\sin(2xL/PI) - \sin(2xL/PI + 2dL/PI))$$
$$= 2*h'_1 * \cos(2xL/PI + sL/PI) * \sin(-d/L*PI)$$
$$= (2h'_1 * \underline{\sin(-d/L*PI)}) * \cos(2xL/PI + dL/PI)$$
$$\text{Constant } A.h'_1$$

$$Bn1 - Bn2 = -Ah_1 * \sin(2xL/PI + dL/PI)$$
$$Bt1 - Bt2 = Ah'_1 * \cos(2xL/PI + dL/PI)$$

Thus, the two obtained signals have different amplitudes but they have a shift of 90° and they are perfectly sinusoidal. The combination, two by two, of the components makes it possible to eliminate any homogeneous external field whatever the direction thereof.

The amplitude of both signals obtained depends on the distance between the two points 1 and 2. The amplitude will be a maximum if both points are spaced by half a period (d=L/2) and null if d=0 or L. Thus, a shifting between two points 1 and 2 will be favoured corresponding to approximately ¼ of a period which seems to be a good compromise between the amplitude of the signals obtained and the overall dimensions of the sensor.

The digital signal processing circuit combines the components and carries out the various compensations (offset, orthogonality, variation in the parameters of the temperature probe) normalises the signals prior to carrying out the division and the calculation of the tangent arc. The output signal obtained is available at the outlet of the integrated circuit, for example as a voltage proportional to the linear travel of the sensor.

The invention will be better understood when seeing the various figures.

Figure 1:
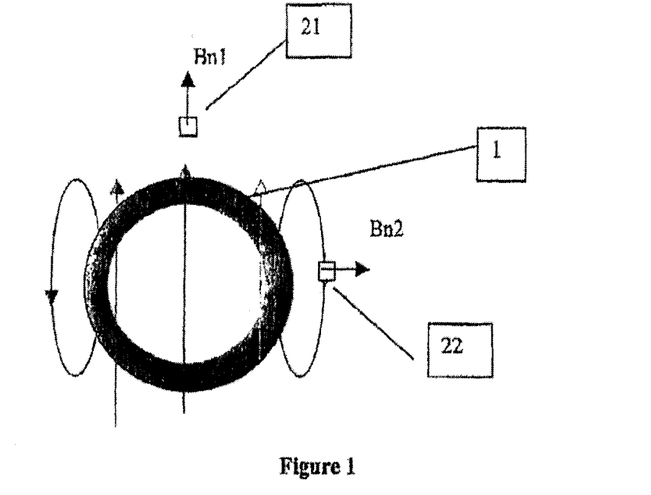
FIG. 1 shows a view of a rotating sensor of the prior art using two normal components of the induction measured in two points spatially having a shift of 90°.
Figure 2:
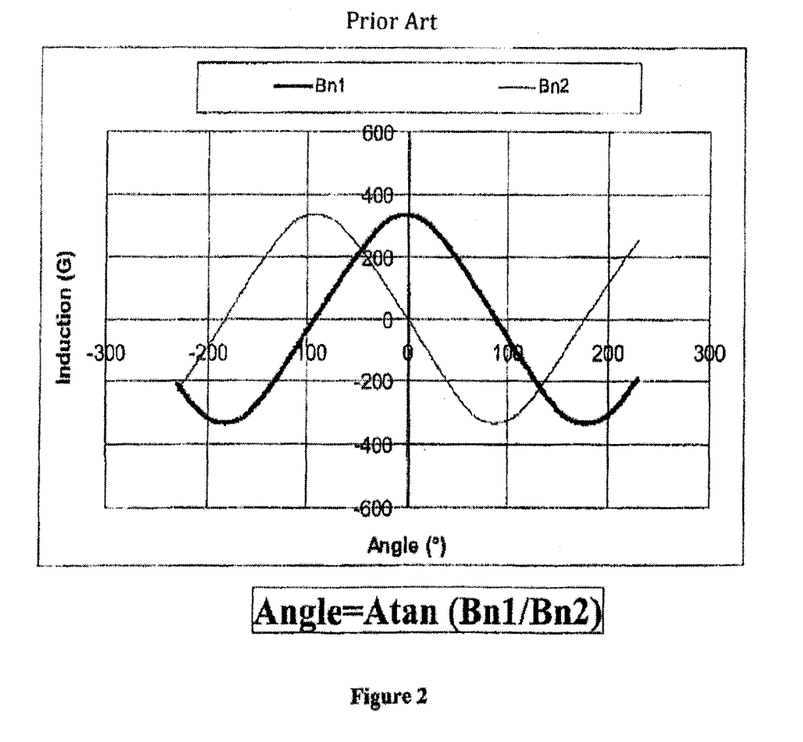
FIG. 2 shows the two normal components of the magnetic induction of a solution of the prior art.

FIGS. 1 and 2 show a solution of the prior art, which is sensitive to the external field. In the figure, we can see a substantially diametrally magnetised permanent ring-shaped magnet 1; this magnet generates in any point of the space a magnet field, the normal components of which are measured by two magneto-sensitive elements 21 and 22, which are spatially shifted by 90°, the signals of which are then processed for decoding the angle as well as for normalising both components, so as to get an electric signal proportional to the angular position of the magnet.

Figure 3:
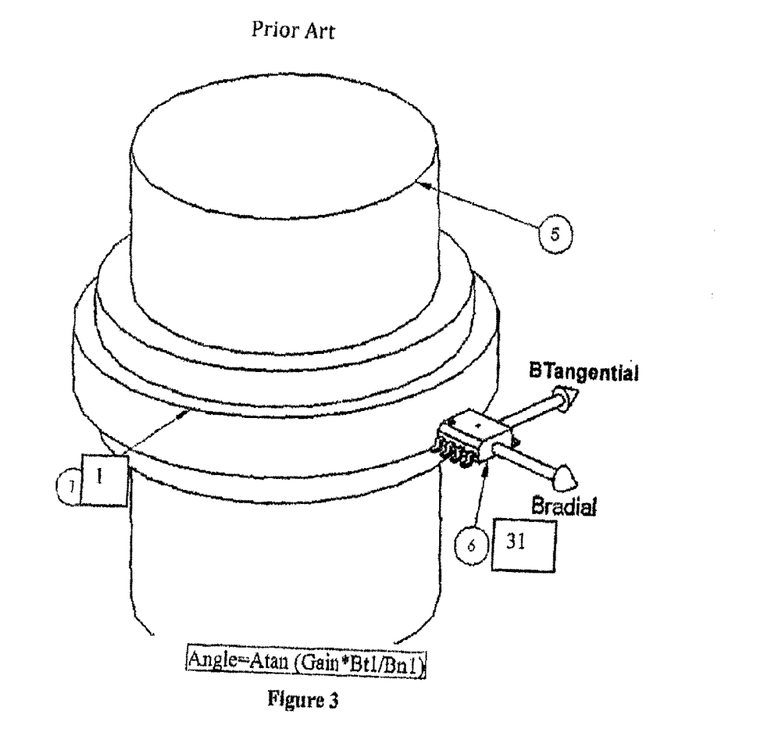
FIG. 3 shows a view of a rotating sensor of the prior art using a normal and tangential component of the induction.

In FIGS. 3 and 4 is shown another solution of the prior art sensitive to the external field and to the lack of diametral magnetisation. Such solution consists of a substantially diametrally magnetised permanent ring 1, such magnet generates in any point of the space a magnetic field, the normal or axial and tangential components of which are measured by two magneto-sensitive elements located at the same point, the signals of which are then processed by a processing element which carries out the decoding as well as the normalisation of both components so as to get an electrical signal which is proportional to the angular position of the magnet.

Figure 5:
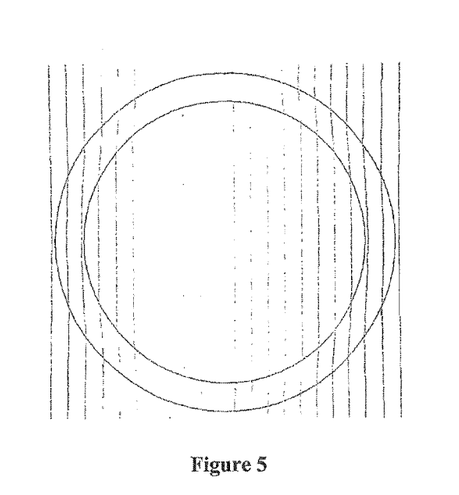
FIG. 5 shows the field lines inside the magnet upon the magnetisation for a material having a relative permeability (μr) equal to 1.2.

FIG. 5 shows the field lines upon the magnetisation, inside and outside a ring-shaped magnet with a relative permeability equal to 1.2. The field lines undergo a deformation when going through the magnet, a deformation which is due to the difference in the relative permeability between the air ($\mu r=1$) and the magnet ($\mu r=1.2$ in the present case). Such deviation of the field lines then results in a poor diameter magnetisation.

Figure 6:
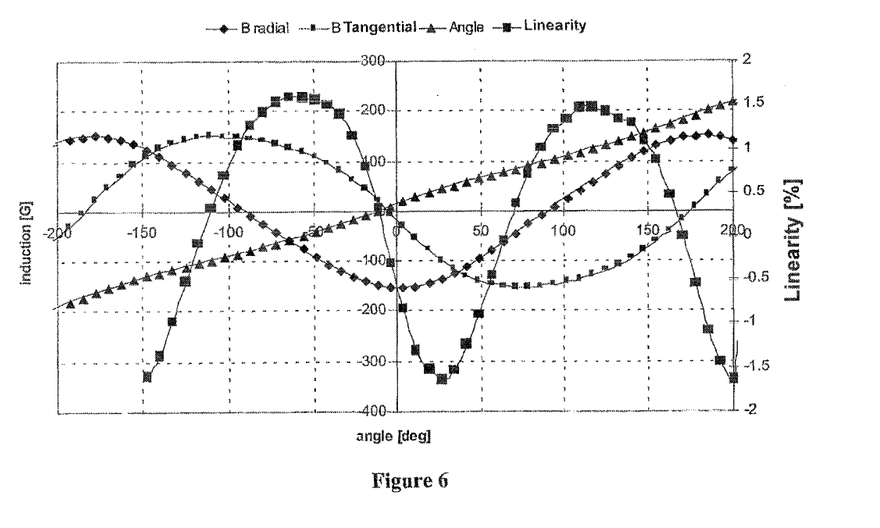
FIG. 6 shows the normal and tangential components of the magnetic induction as well as the non-linearity of the signal measured on a "diametrally" magnetised isotropic circular ring-shaped magnet.

FIG. 6 shows the normal and tangential components which are not perfectly sinusoidal because of the poor diameter magnetisation and the non-linearity obtained from such signals.

Figure 7:
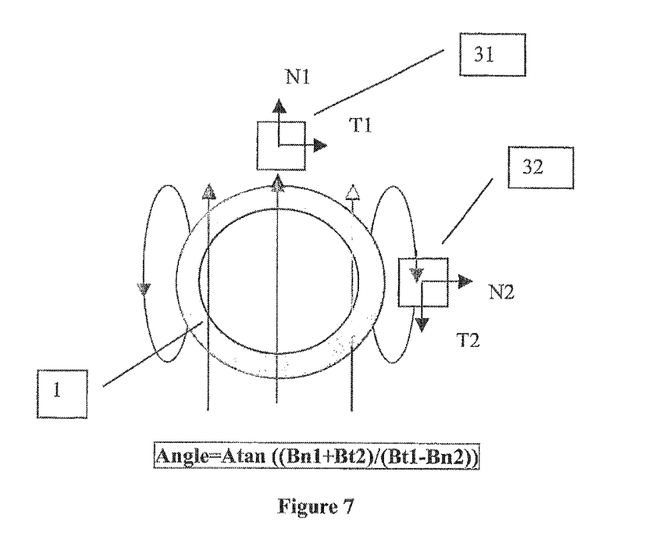
FIG. 7 shows a general view of the present invention between the two bidirectional probes 31 and 32.
Figure 8:
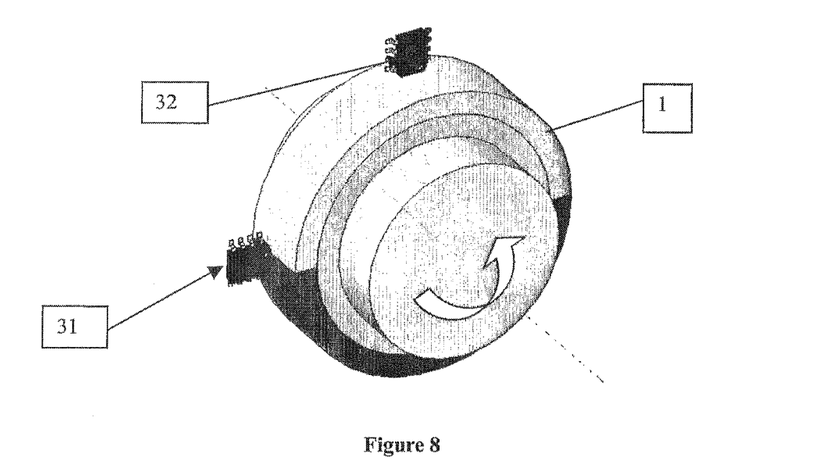
FIG. 8 shows a 3-dimensional view of the present invention with both bidirectional probes 31 and 32, FIG. 9 only shows the normal and tangential components of the magnetic induction of probe 31.

FIGS. 7 and 8 show views of the present invention. This solution consists of a substantially diametrally magnetised permanent ring-shaped magnet 1, such magnet generates in any point of the space of a magnet field, the normal or axial and tangential components of which are measured by four magneto-sensitive elements. Two magneto-sensitive elements are located at the same point and they are advantageously integrated in the same housing 31 and the two other magneto-sensitive elements are located at the same point advantageously integrated in a same housing 32 which is spatially shifted by 90° to the housing 31. The four signals are then combined two by two to cancel the effect of an external field and the errors due to a diametral magnetisation, so as to obtain an electrical signal which is perfectly proportional to the angular position of the magnet. The signal processing circuit can be integrated in one of the housings 31 or 32 or in both for a redundancy issue or may be carried out outside a housing 31 and 32.

Figure 9:
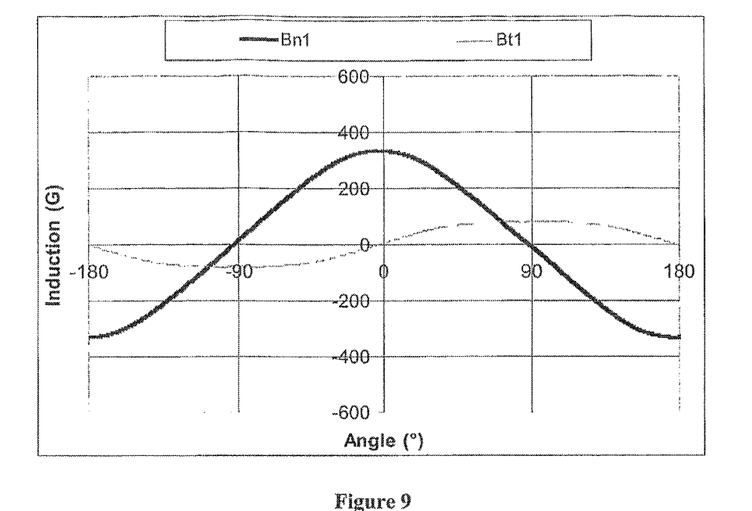
Figure 10:
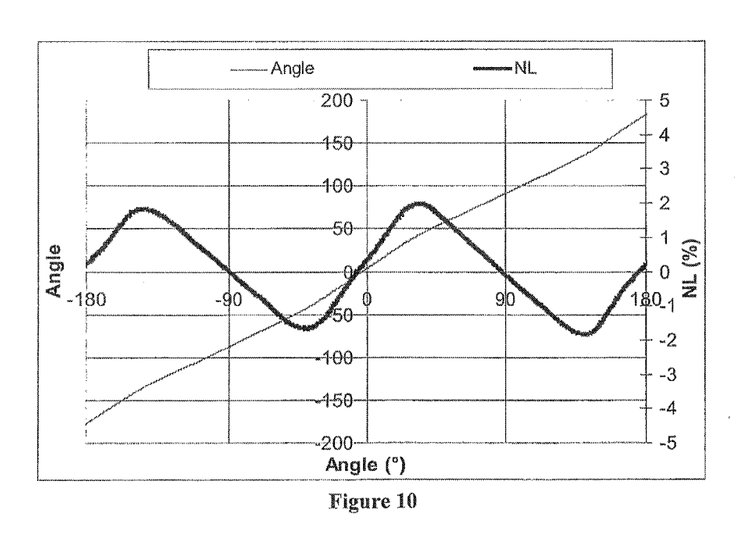
FIG. 10 shows the non-linearity of the signal measured by the probe 31 on a "diametrally" magnetised isotropic circular ring-shaped magnet.

FIGS. 9 and 10 show the measurement of two normal and tangential components generated in only one point by a diametral magnet and the error obtained when using only one sensor 31.

Figure 11:
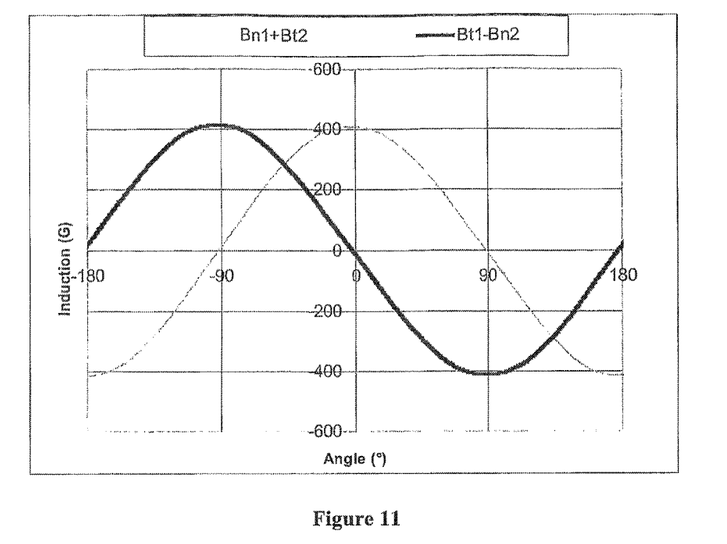
FIG. 11 shows two sinusoidal signals obtained from the combination two by two of the normal and tangential components of the magnetic induction measured by the probes 31 and 32.

FIG. 11 shows the combination two by two of the four signals measured by the four magneto-sensitive elements integrated in the housings 31 and 32. Two perfectly sinusoidal signals having the same amplitude are obtained by adding the normal components measured by (31) and the tangential component measured by 32 and by subtracting the normal component measured by 32 from the tangential component measured by 31.

Figure 12:
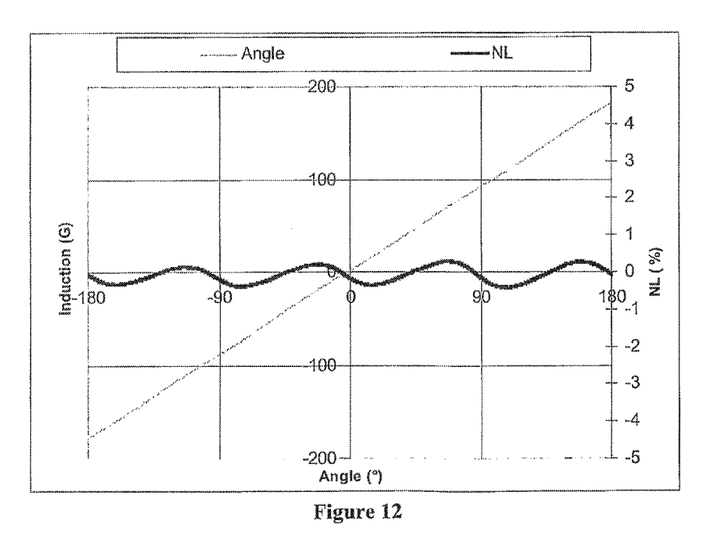
FIG. 12 shows the non-linearity obtained from the signals in FIG. 11.

FIG. 12 shows the output angle decoded from both sinusoidal signals in FIG. 11 and the non-linearity thus obtained. The error obtained by combining four components makes it possible to cancel the errors resulting from the diametral magnetisation.

Figure 14:
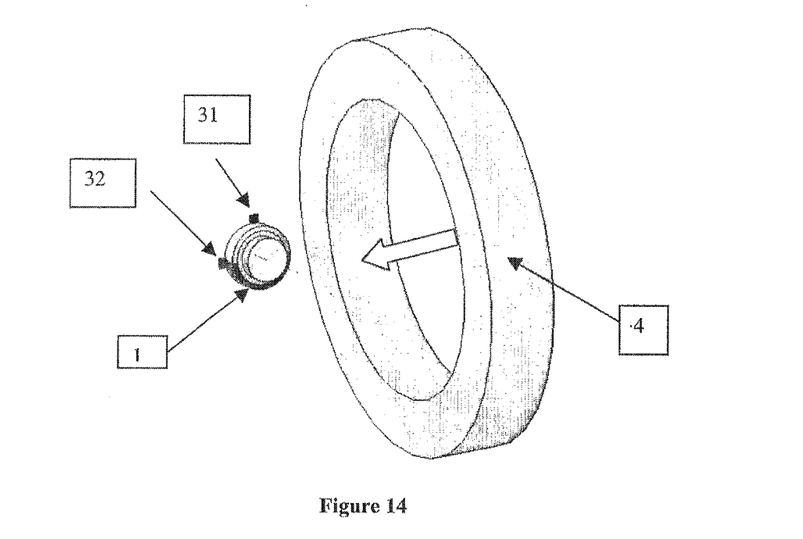
FIG. 14 shows a view of the invention and an exciting coil which creates an external magnetic field.

FIGS. 13 and 14 show the present invention in the presence of an external magnetic field. FIG. 13 shows two different positions of the magnet 1 under the effect of an homogeneous external field Bext. The external field is in this case horizontal and interferes with the tangential component of the probe 31 and the normal component of the probe 32. FIG. 14 is a view of the present invention with a coil 4 which generates an interfering magnetic field. The source of the generation of the external field could be a magnet instead of the coil.

Figure 15:
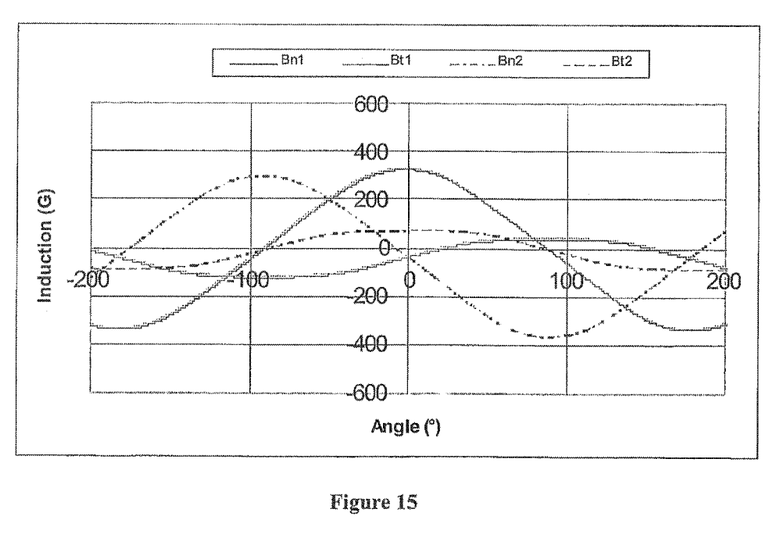
FIG. 15 shows both normal and tangential components of probes 31 and 32 under the effect of an external field such as defined in FIG. 14.

FIG. 15 shows a measure of both normal components and both tangential components measured by the magneto-sensitive elements of the probes 31 and 32 in the presence of an external field as shown in both previous figures. Then, it can be seen that the normal component of the probe 32 and the tangential component of the probe 31 are actually affected.

Figure 16:
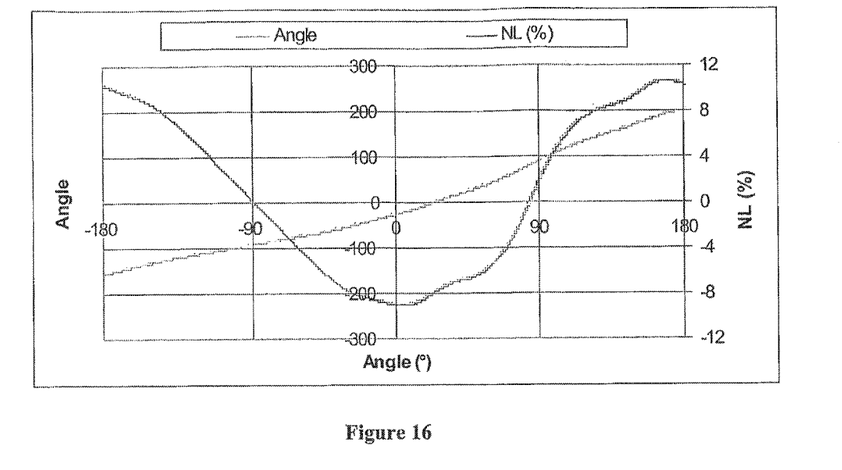
FIG. 16 shows the non-linearity of the signal measured by the probe 31 on a "diametrally" magnetised isotropic circular ring-shaped magnet under the effect of the external field.
Figure 17:
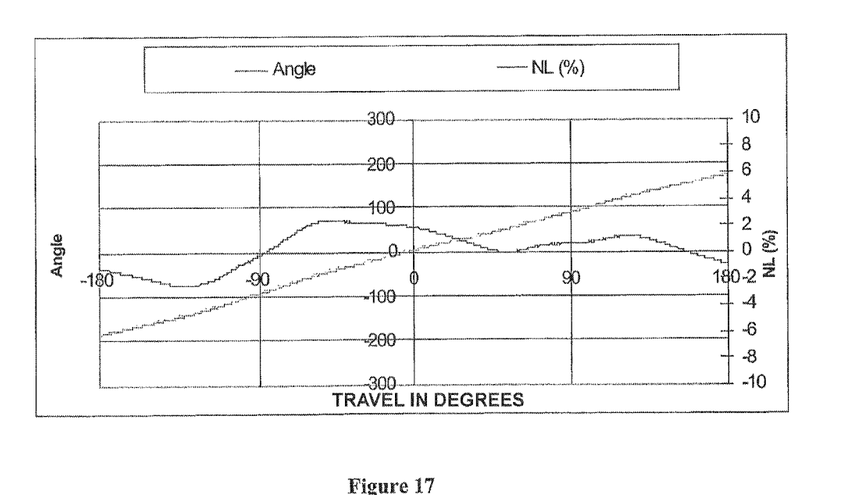
FIG. 17 shows the non-linearity of the signal measured by the probe 32 on a "diametrally" magnetised isotropic circular ring-shaped magnet under the effect of the external field.

FIGS. 16 and 17 respectively show the output signal of the housing 31 and 32 as well as the non-linearity of the two signals under the effect of the external field defined in the previous figures. Then, it can be considered that the signal at the housing 31 outlet is not at all linear because of the external field which modifies the tangential component thereof and the housing output signal 32 is also non-linear because of the modification in the normal component due to the external field generated by the coil.

Figure 18:
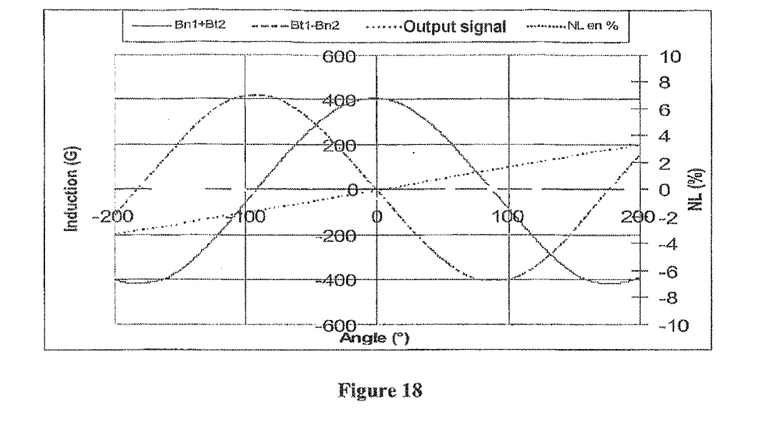
FIG. 18 shows the non-linearity of the signal obtained by a combination two by two of the normal and tangential components measured by the probes 31 and 32.

FIG. 18 shows the result obtained by the present invention. It shows the two signals obtained after the combination of four signals measured by 31 and 32 (Bn1+Bt2, Bt1−Bn2) with the output signal after the calculation of the tangent arc (Bn1+Bt2)/(Bt1−Bn2) and the non-linearity of such signal. The present invention thus makes it possible, in spite of the presence of an external field, to have a sensor which is always linear contrary to the solutions of the prior art.

Figure 19:
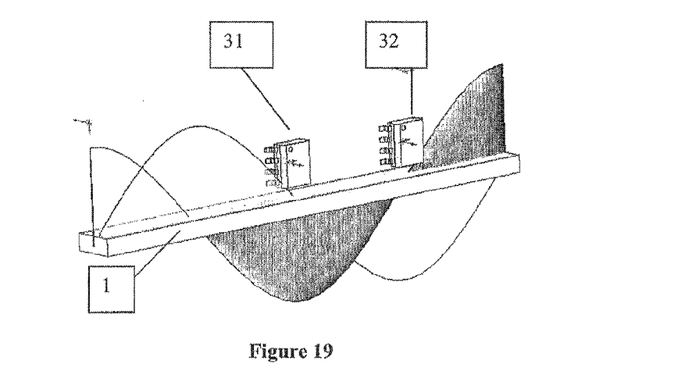
FIG. 19 shows a general view of the present invention applied to a linear sensor with both bidirectional probes 31 and 32.

FIGS. 19 and 20 show two views of the present invention applied to a linear sensor. Such figures show a magnet (1) having a length L with a magnetisation shown by vector M, the direction of which varies linearly along the length of the plane defined by the direction of the displacement X and a normal to such direction. Both sensors 31 and 32 each measure the normal component and the tangential component of the magnetic field generated by the magnet 1. Both sensors are spatially spaced by a few millimetres.

FIG. 21 is the same view as FIG. 20 with the presence of an external magnetic field Bn_ext+Bt$_{13}$ ext which adds to the measurement of the magnetic field generated by the magnet. The present invention, by making a subtraction of both normal components of 31 and 32 (Bn1−Bn2) and the subtraction of both tangential components of (31) and (32) (Bt1−Bt2) makes it possible to cancel such external interference and to process only signals from the magnetic field generated by the magnet 1.

Figure 22:
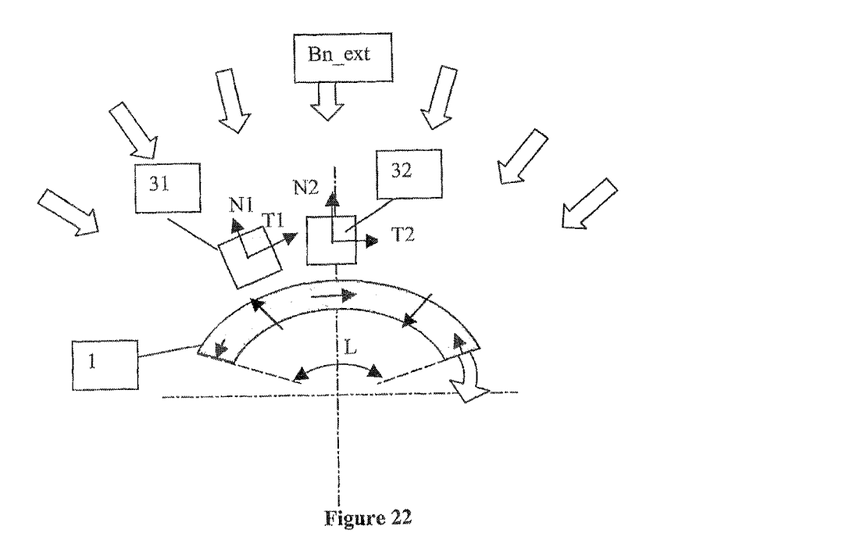
FIG. 22 shows a general view of the present invention applied to a small angle rotating sensor with both bidirectional probes 31 and 32.

FIG. 22 shows a view of the present invention applied to a small angle rotating sensor with the presence of an external magnetic field Bext which adds to the measurement of the magnetic field generated by the magnet. The present invention by making the subtraction of both normal components of 31 and 32 (Bn1−Bn2) and the subtraction of both tangential components 31 and 32 (Bt1−Bt2) makes it possible to cancel such external interference and to process only signals from the magnetic field generated by the magnet 1.

Figure 23:
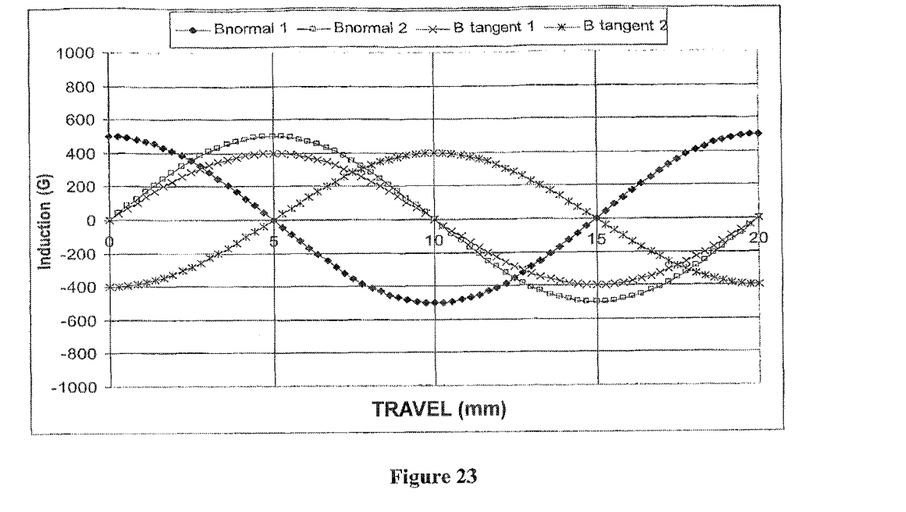
FIG. 23 shows both normal and tangential components of the probes 31 and 32 spatially shifted by ¼ of a period.

FIG. 23 shows both normal components and both tangential components measured by the magneto-sensitive elements of the probes 31 and 32. In this case, the probes 31 and 32 are spatially shifted by a quarter of a period.

Figure 24:
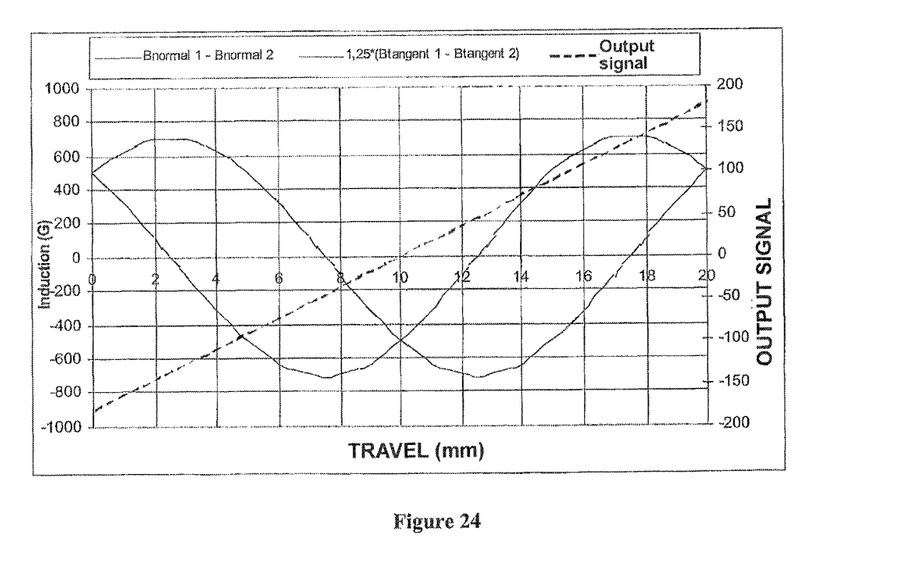
FIG. 24 shows both sinusoidal signals resulting from the combination two by two of the four signals and the output signal obtained in the end.

FIG. 24 shows the result obtained by the present invention. It shows both signals obtained after the combination of the four signals measured by 31 and 32 and normalisation of such signals (Bn1−Bn2, Gain*(Bt1−Bt2)) and shows the output signal after the calculation of the tangent arc (Bn1−Bn2/Gain*(Bt1−Bt2)).

FIG. 25 shows an optimised embodiment of the present invention to obtain a very high precision sensor.

This solution consists of a substantially diametrally magnetised permanent ring-shaped magnet 1, such magnet 1 generates in any point of the magnetic field, the normal or axial and tangential components of which are measured by eight magneto-sensitive elements. Two magneto-sensitive elements are located in a single point and advantageously integrated in the same housing 31a and the two other magneto-sensitive elements are located at the same point and advantageously integrated in the same housing 32a which is spatially shifted by 90° with respect to the housing 31a. Two other magneto-sensitive elements are located at only one point and advantageously integrated in the same housing 31b and the two other magneto-sensitive elements are located at a same point advantageously integrated in the same housing 32b, and the housings 31b and 32b spatially shifted with respect to each other by 90° are both spatially shifted by 45° with respect to the first quadrature housings 31a and 32a. The eight signals are then added two by two to cancel one of the errors resulting from the diametral magnetisation. The four resulting signals are then combined two by two to cancel the effect of an external field and the errors due to a diametral magnetisation so as to obtain an electric signal perfectly proportional to the angular position of the magnet. The signal processing circuit may be integrated in one of the housings or in the four of them for an issue of redundancy, or it can be carried out outside of the housings.

Figure 26:
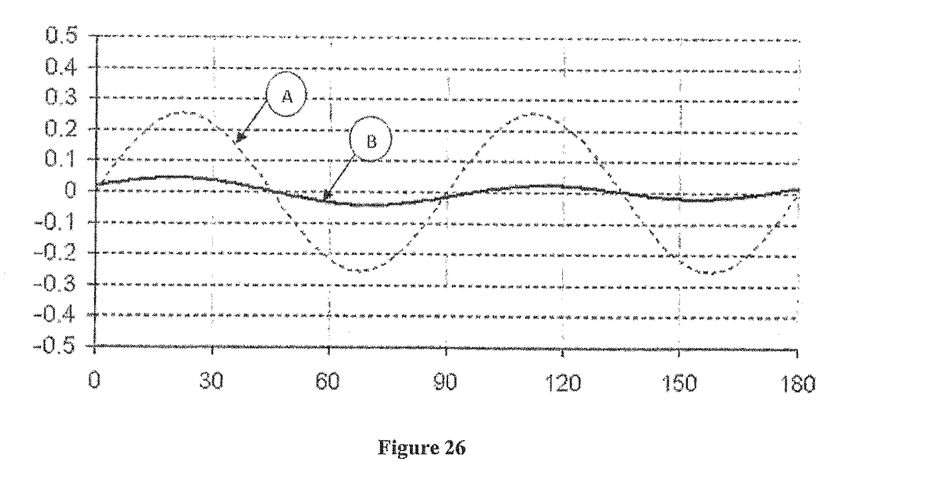
FIG. 26 shows a non-linearity of the simulated signal of the present invention and the possible improvement thereof thanks to the optimisation using two other bidirectional probes 31b and 32b.

FIG. 26 shows a comparison of the possible improvement of the linearity error (in percentage of 360° as a function of the travel in degrees) obtained by the addition of four magneto-sensitive elements (housings 31b and 32b) cleverly positioned to correct the magnetisation error relating to the geometry of the magnet 1.

It can be seen from this figure that the signal A resulting from the previous embodiments can be not perfectly linear according to the conditions of magnetisation, with the dimensions of the magnet and the nature thereof, mainly through the introduction of an harmonic 3 which is not integrally compensated (it is commuted to H4 through the tangent arc function). On the contrary, signal B resulting from the embodiment shown in FIG. 25 makes it possible to improve, or even to cancel, such defects in linearity.

The invention claimed is:

1. An angular or linear magnetic position sensor that comprises a mobile member including at least one magnet having a magnetization direction that varies linearly along the movement direction of the magnet in a surface defined by the movement direction and a normal direction, at least four magneto-sensitive elements, and at least one processing circuit providing a signal based on the absolute position of the mobile member, the magnetic position sensor comprising:
    a first set of magneto-sensitive elements comprising a first couple of magneto-sensitive elements located at the same point, and being spatially offset from a second set of magneto-sensitive elements comprising a second couple of magneto-sensitive elements located at the same point, along the movement direction of the magnet, wherein one magneto-sensitive element of each of the first and second sets of magneto-sensitive elements measures the tangential component of a magnetic field and a remaining magneto-sensitive element of each of the first and second sets of magneto-sensitive elements measures the normal component of the magnetic field, and
    the at least one processing circuit is configured to carry out at least two algebraic combinations, each algebraic combination including a component of the first set of magneto-sensitive elements and a component of the second set of magneto-sensitive elements, so as to define two sinusoidal signals substantially having an electrical phase shift of 90°.

2. A magnetic position sensor according to claim 1, wherein the at least one processing circuit is configured to carry out an amplification, an addition or a subtraction of the components of the magnetic field generated by the magnet.

3. A linear position sensor according to claim 2, wherein the first set of magneto-sensitive elements and the second set of magneto-sensitive elements are spatially offset by more than $1/16^{th}$ of a period and by less than $15/16^{th}$ of a period along the axis of translation of the mobile part and the at least one processing circuit is configured to combine a plurality of signals originating from the first and second sets of magneto-sensitive elements as follows:

$A \tan((B2-B4)/\text{Gain}*(B3-B5))$ where:

B2 corresponds to the normal component measured by one magneto-sensitive element belonging to the first set of magneto-sensitive elements;
B3 corresponds to the tangential component measured by another element belonging to the first set of magneto-sensitive elements;
B4 corresponds to the normal component measured by one magneto-sensitive element belonging to the second set of magneto-sensitive elements;
B5 corresponds to the tangential component measured by another element belonging to the second set of magneto-sensitive elements; and
Gain corresponds to a normalization of the plurality of signals (B2-B4) and (B3-B5) by adjusting the amplitude of the signal (B3-B5), so as to obtain two signals (B2, B4) and (B3-B5) having an electrical phase shift of 90° and the same amplitude.

4. An angular position sensor according to claim 1, wherein the first set of magneto-sensitive elements and the second set of magneto-sensitive elements are offset by a quarter of a period along the axis of rotation and the at least one processing circuit is configured to combine a plurality of signals originating from the first and second sets of magneto-sensitive elements as follows:

$A \tan(B2+B5)/(B3-B4))$ where:

B2 corresponds to the normal component measured by one magneto-sensitive element belonging to the first set of magneto-sensitive elements;
B3 corresponds to the tangential component measured by another element belonging to the first set of magneto-sensitive elements;
B4 corresponds to the normal component measured by one magneto-sensitive element belonging to the second set of magneto-sensitive elements; and
B5 corresponds to the tangential component measured by another element belonging to the second set of magneto-sensitive elements.

5. A magnetic position sensor according to claim 1, wherein the first set of magneto-sensitive elements is integrated in a first housing and the second set of magneto-sensitive elements is integrated in a second housing.

6. A magnetic position sensor according to claim 1, wherein the permanent magnet is a hollow cylinder, a tile or a flat magnet.

7. A magnetic position sensor according to claim 1, wherein the magneto-sensitive elements are substantially located in the mid-plane of the magnet, the mid-plane being perpendicular to the axis of rotation of the magnet.

8. A magnetic position sensor according to claim 1, wherein the permanent magnet is stuck on a rotating shaft or a translating shaft, the position of which is to be measured.

9. A magnetic position sensor according to claim 1, wherein the permanent magnet is stuck on a ferromagnetic support assembly.

10. An angular position sensor according to one of claims 1 to 9, wherein the magnet has a progressive sinusoidal magnetisation along the magnet.

11. An angular position sensor according to claim 1, further comprising:
    a third set and a fourth set of magneto-sensitive elements spatially offset with respect to the first set and second set of magneto-sensitive elements;
    wherein each of the third set and fourth set of magneto-sensitive elements comprises a couple of magneto-sensitive elements located at the same point, one magneto-sensitive element of the third set and the fourth set of magneto-sensitive elements being configured to measure the tangential component of the magnetic field, and another magneto-sensitive element of the third set and the fourth set of magneto-sensitive elements configured to measure the normal component of the magnetic field, and the at least one processing circuit being configured to, prior to carrying out the algebraic combinations, respectively add the normal components of the first set and of the third set of magneto-sensitive elements and the tangential components of the first set and the third set of magneto-sensitive elements, as well as respectively add the normal components of the second set and the fourth set of magneto-sensitive elements and the tangential components of the second set and the fourth set of magneto-sensitive elements.

\* \* \* \* \*